United States Patent [19]
Steigerwald et al.

[11] 4,039,914
[45] Aug. 2, 1977

[54] DYNAMIC BRAKING IN CONTROLLED CURRENT MOTOR DRIVE SYSTEMS

[75] Inventors: Robert L. Steigerwald, Scotia; Edward P. Cornell, Schenectady, both of N.Y.

[73] Assignee: General Electric Company, Schenectady, N.Y.

[21] Appl. No.: 635,143

[22] Filed: Nov. 25, 1975

[51] Int. Cl.² .............................................. H02P 3/12
[52] U.S. Cl. .................................... 318/375; 318/212
[58] Field of Search ............... 318/212, 211, 227, 209, 318/375

[56] References Cited
U.S. PATENT DOCUMENTS

| 3,365,638 | 1/1968 | Risberg | 318/227 |
|---|---|---|---|
| 3,906,314 | 9/1975 | Wiart | 318/212 |

Primary Examiner—Herman J. Hohauser
Attorney, Agent, or Firm—Donald R. Campbell; Joseph T. Cohen; Jerome C. Squillaro

[57] ABSTRACT

A current source power converter for an electric motor is comprised by a combined controlled rectifier and chopper which is coupled to a controlled-current inverter by a dc reactor. In the motoring mode the combined rectifier and chopper functions as a phase controlled rectifier to control the current magnitude. In the dynamic braking mode a line switch is opened and a braking resistor placed across the rectifier output, and the combined rectifier and chopper is operated as a chopper to control the average voltage across the braking resistor and thus the current magnitude during braking.

9 Claims, 7 Drawing Figures

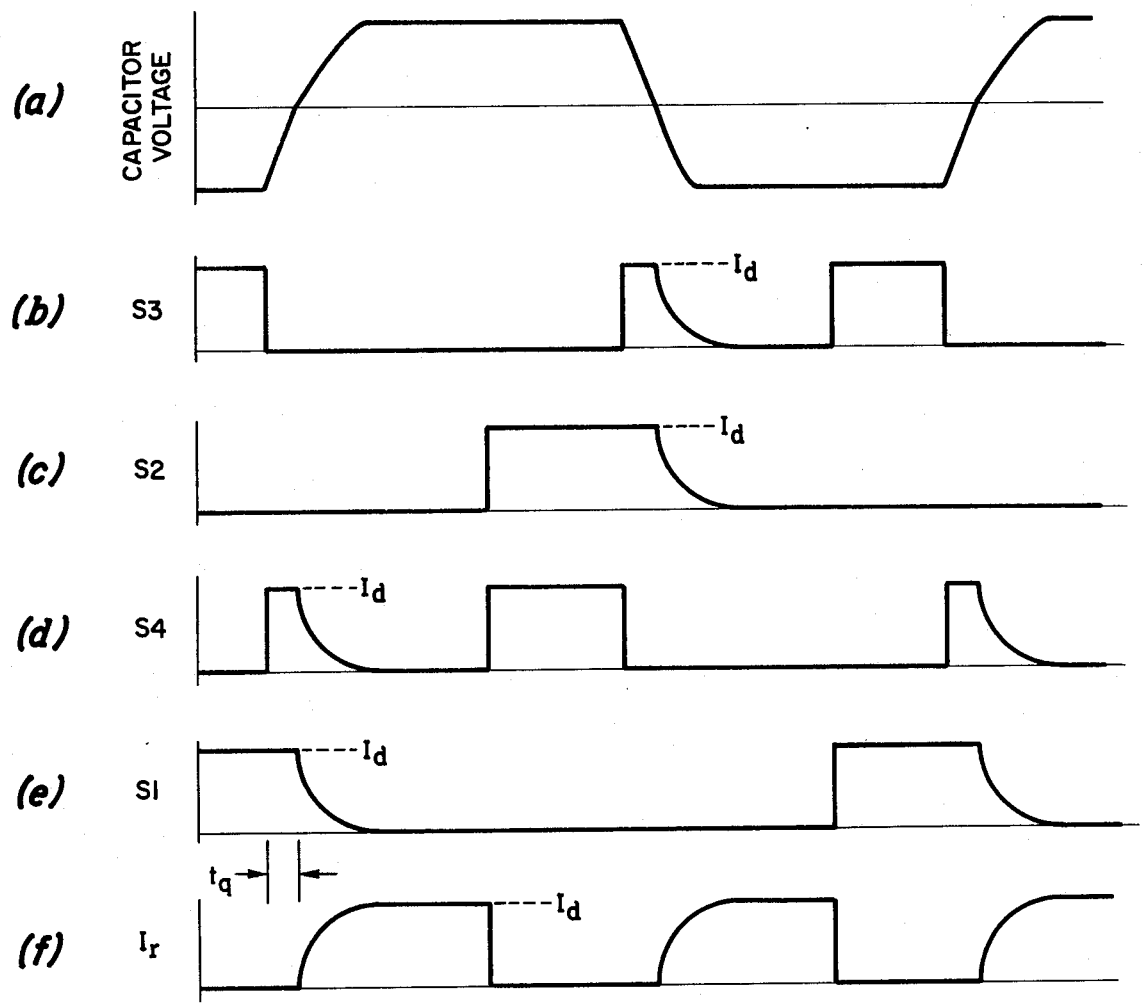
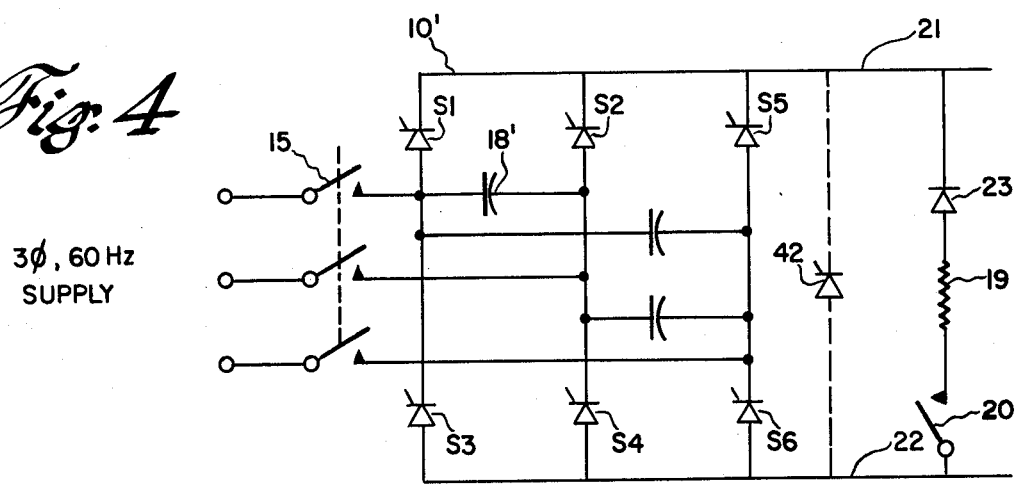

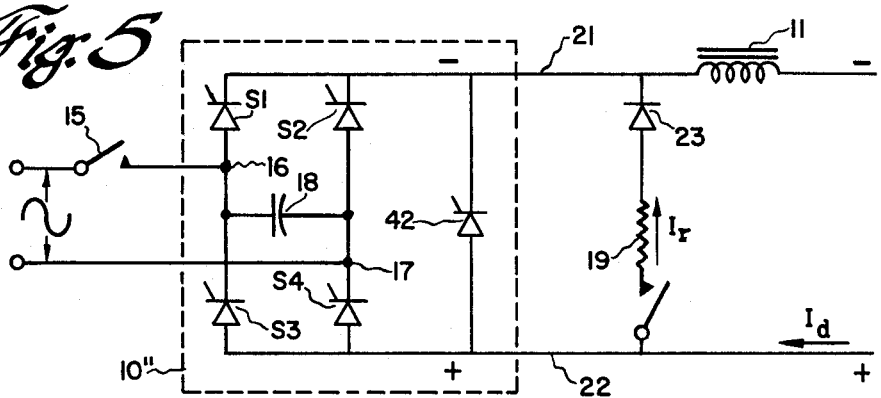
Fig. 5
(a) AUXILIARY THYRISTOR VOLTAGE
$t_q$
(b) CAPACITOR VOLTAGE
(c) $I_r$ — $I_d$
Fig. 6
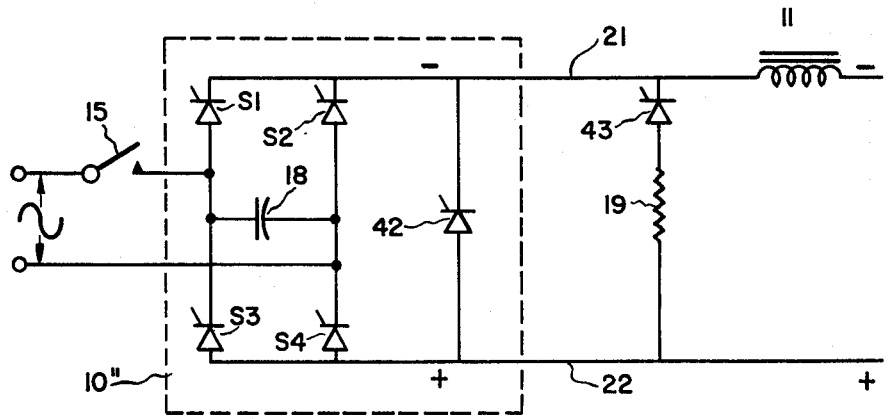
Fig. 7

DYNAMIC BRAKING IN CONTROLLED CURRENT MOTOR DRIVE SYSTEMS

BACKGROUND OF THE INVENTION

This invention relates to motor drive systems using current source power converters, and more particularly to a motor controller having provision for the dynamic braking of an ac machine fed from a controlled current inverter.

During regenerative braking of a conventional voltage and frequency controlled induction motor, the direction of current through the inverter supplying the motor reverses and power is returned to the dc supply. Controlled current drive systems, however, use a current-fed inverter in which the output current magnitude and frequency are controlled rather than the output voltage and frequency as in the usual inverter. The dc reactor in cascade with the current-fed inverter forces constant dc link current which is not easily interrupted. Although the rectifier output voltage and inverter input voltage change polarity during regenerative operation, the direction of current does not change polarity. Accordingly, different techniques are needed to control operation of the current source power converter while braking, particularly when ordinary regenerative braking is not suitable such as when the ac line will not accept the power fed back to it. In large traction drives, for example, dynamic braking is highly desirable. In this case power can be dissipated by opening the ac line and placing a braking resistor across the rectifier output terminals, but in the absence of further controls the braking action is uncertain and can result in motor instability. Thus, a dynamic braking control of any regulated drive should provide for control of the power dissipated in the braking resistor in order to assure constant torque control during braking.

SUMMARY OF THE INVENTION

In accordance with the invention, a current source power converter for a controlled current induction or synchronous motor drive system is comprised by a combined controlled rectifier and chopper and a conventional controlled current inverter coupled in cascade with a dc reactor therebetween. The combined controlled rectifier and chopper is provided by a conventional single phase full wave bridge rectifier, constructed with thyristors or other controlled switch devices, usually having a commutating capacitor directly between the rectifier input terminals to supply commutating energy. A three phase bridge rectifier in similar fashion has delta-connected commutating capacitors, while in a modification an auxiliary thyristor is placed between the rectifier output terminals with a polarity to shunt the braking resistor. For dynamic mode braking operation the braking resistor and a braking switch are provided in series between the rectifier output terminals, and an optional braking resistor and parallel switch can be included in the dc link when additional voltage is needed.

In the motoring mode the combined controlled rectifier and chopper is operated by a suitable control means as a phase controlled rectifier to vary the dc output voltage thereof and thus the magnitude of the dc current fed to the controlled current inverter, and the control means as is known determines the operating frequency of the inverter. In the dynamic braking mode the braking switch is closed and the line switch opened, and the control means operates the combined controlled rectifier and chopper as a chopper circuit to generate variable width voltage pulses between the rectifier output terminals and across the braking resistor. Thus the direct current magnitude fed to the controlled current inverter during dynamic braking is controlled. In effect the chopper circuit operation is to alternately by-pass current from the braking resistor to a pair of rectifier thyristors or to the auxiliary thyristor between the rectifier output terminals, thereby controlling the average dc voltage across the braking resistor. In the first case the controlled rectifier with commutating capacitor functions as the chopper whereas in the second case the controlled rectifier with commutating capacitor functions as a commutating circuit for the auxiliary thyristor. Accordingly, controlled and stable motor operation under dynamic braking conditions is made possible. A modification is described for implementing alternate dynamic and regenerative braking.

BRIEF DESCRIPTION OF THE DRAWINGS

FIGS. 3a–3f show a series of waveform diagrams useful in explaining operation of the combined controlled rectifier and chopper;

FIG. 4 is a schematic circuit diagram of a three phase version of the combined controlled rectifier and chopper with a braking resistor across the output;

FIG. 5 is a detailed circuit diagram of a second embodiment of the invention in which the controlled rectifier with added capacitor is operated as a commutating circuit for an auxiliary thyristor to obtain chopper operation during dynamic braking;

FIGS. 6a–6c show waveform diagrams useful in explaining the operation of FIG. 5; and FIG. 7 illustrates a modification of FIG. 5 for alternate regenerative and dynamic braking.

DESCRIPTION OF THE PREFERRED EMBODIMENTS

Figure 1:
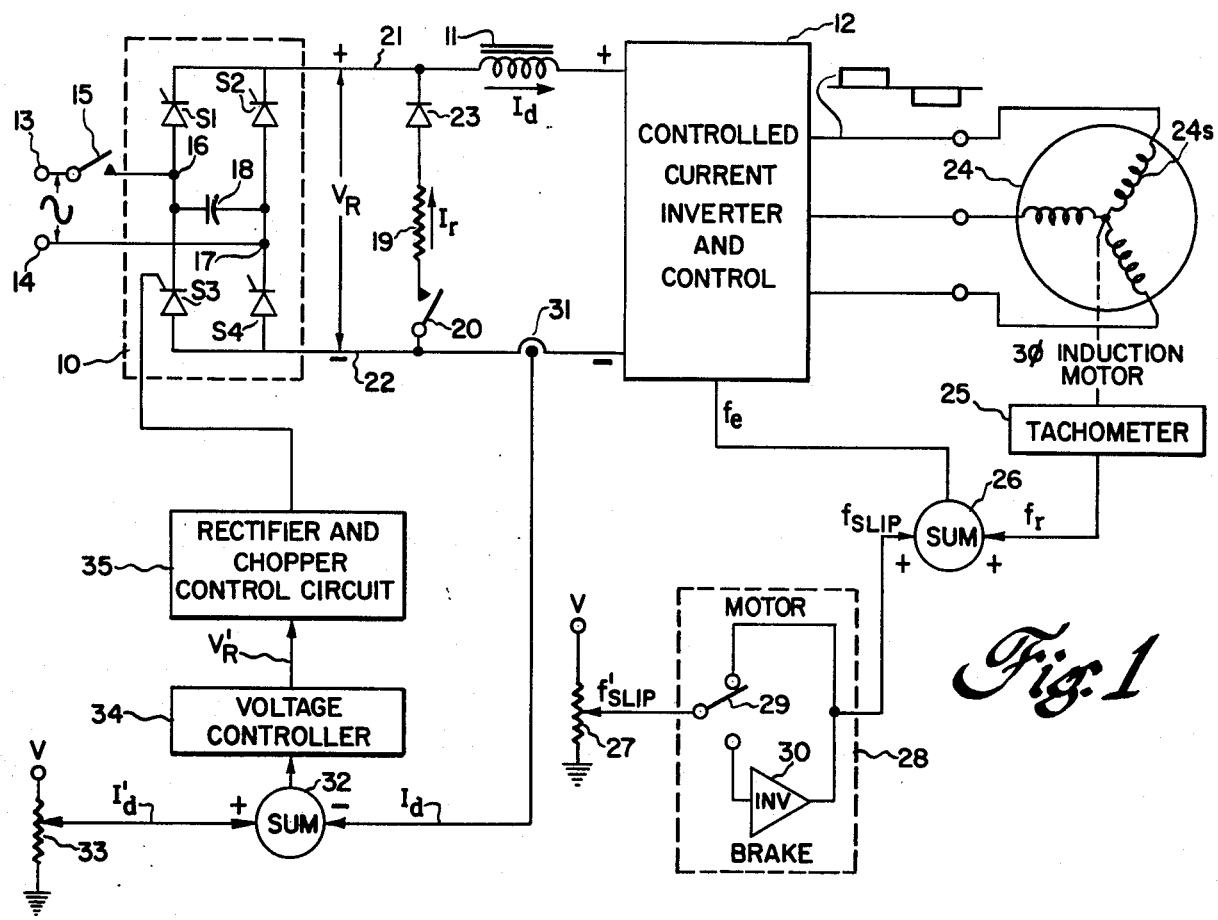
FIG. 1 is a schematic circuit diagram partially in block diagram form of one embodiment of the controlled current motor drive system in which the controlled rectifier with added commutating capacitor is operated as a chopper during dynamic braking to control the average dc link voltage.

The controlled current motor drive system with dynamic braking capability shown in FIG. 1 is discussed with regard to a motor controller for an ac induction motor but can also be used with synchronous motors. For this application the static current source power converter is generally comprised by a combined full wave controlled rectifier and chopper 10 which is coupled by a dc smoothing reactor 11 to a cascaded controlled current inverter 12 capable of variable frequency operation. The single phase combined controlled rectifier and chopper 10 here illustrated is suitable for energization by a 60 Hz, single phase commercially available supply of ac voltage, although various voltages and frequencies can be used depending upon the application. A three phase version of the combined controlled rectifier and chopper is illustrated in FIG. 4. In FIG. 1, the circuit input terminals 13 and 14 are connected through an ac line switch 15 to the rectifier input terminals 16 and 17, and the combined controlled rectifier and chopper is comprised by a conventional full wave bridge rectifier constructed with four gate controlled thyristors S1–S4 or other controlled switch devices, with the modification that a commutating capacitor 18 is connected directly between the rectifier input terminals. For dynamic braking purposes, the current source power converter further includes a braking resistor 19 and dynamic braking switch 20 in series between the rectifier output terminals 21 and 22, and this series circuit desirably includes a diode 23 with a polarity and location such that its cathode is coupled to the positive rectifier output terminal 21.

In the motoring mode in which power flows in the direction from the supply to the motor, combined controlled rectifier and chopper 10 operates as a conventional phase controlled rectifier to supply variable dc output voltage $V_R$ to smoothing reactor 11 and thereby control the magnitude of the constant, regulated dc current $I_d$ supplied to inverter 12. Three phase controlled current inverter 12 produces variable amplitude and frequency rectangular wave output currents that are supplied to the stator windings 24s of the three phase induction motor 24. The magnitude of the rectangular wave output currents is the same as the dc link current $I_d$, since in effect the inverter operates to switch the input dc link current among the three stator supply lines. Various closed feedback loop control strategies can be employed in implementing a control circuit or a control means for the static current source power converter, typically with provision for stable four-quadrant operation at an adjustable pre-set torque or motor speed. For example, one such control strategy is described in the allowed copending patent application, Ser. No. 617,187 filed Sept. 26, 1975 by Edward P. Cornell and Thomas A. Lipo, entitled "Controlled Current Induction Motor Drive", and assigned to the same assignee as this invention. The control circuit shown in FIG. 1 for independently setting the slip frequency $f_{slip}$ and the dc link current $I_d$ or stator line current is one possible approach and illustrates the principles of such control strategies. In the first of these feedback control loops, a tachometer 25 or other rotor shaft speed sensor is used to generate a sensor signal indicative of the rotor mechanical speed, and a suitable transducer (not here shown) is provided for deriving the rotor electrical frequency $f_r$. To constrain the motor excitation electrical frequency to be the sum of slip and rotor frequency, the rotor frequency signal $f_r$ and the slip frequency signal $f_{slip}$ are applied to a summing circuit 26 to derive the electrical frequency control signal $f_e$. Assuming that current controlled inverter 12 is by way of example the auto-sequential commutated thyristor inverter shown in detail in FIG. 2, control signal $f_e$ is used to determine the operating frequency of controlled current inverter 12 by controlling the frequency of gating pulses applied in proper sequence to the gates of the power thyristors. Hence, the frequency of the inverter output currents and the motor excitation electrical frequency are essentially determined by the magnitude of control signal $f_e$. The command value of slip frequency $f'_{slip}$ typically is set manually as by using a potentiometer 27, and is applied to a motor-brake control 28 which functions to invert the command slip frequency only when braking is commanded to thereby obtain four-quadrant operation. Motor-brake control 28 can take the form illustrated utilizing a two-position switch 29 which is manually movable between a motor position and a brake position. In the motor position there is no change of polarity, while in the brake position the signal is fed through an inverter 30 to result in a negative polarity slip frequency signal being produced at the output of the motor-brake control. Forced regenerative operation of the controlled current inverter is then obtained as will be explained more fully.

In the other feedback control loop for controlling the magnitude of the dc link current $I_d$ fed to controlled current inverter 12, a current shunt or other suitable current sensor 31 continuously generates a signal indicative of the instantaneous dc link current $I_d$ which is fed to another summing circuit 32. The error signal representing the difference between a command value of dc link current $I'_d$, obtained for example at the wiper of a manually setable potentiometer 33, and the value of actual sensed current in turn is fed to a suitable integral plus proportional type voltage controller 34 which generates the dc control signal $V'_R$ representing the desired value of rectifier dc output voltage. Control signal $V'_R$ is supplied to a rectifier and chopper control circuit 35 of conventional construction as is known in the art for generating phase control gating signals for thyristors S1–S4 whose timing depends upon the magnitude of the dc control signal. Thus, combined controlled rectifier and chopper 10 is operated as a phase controlled rectifier to vary the rectifier dc output voltage $V_R$ and thus the magnitude of the dc link current $I_d$ fed to inverter 12. The polarity of the rectifier dc output voltage and of the inverter input voltage are as designated in FIG. 1. During motoring operation, the added commutating capacitor 18 connected across the ac line functions as a power factor correction capacitor. Since the command value of current $I'_d$ is proportional to torque, it is observed that with the proper control strategy torque is maintained at a constant preset value.

Figure 2:
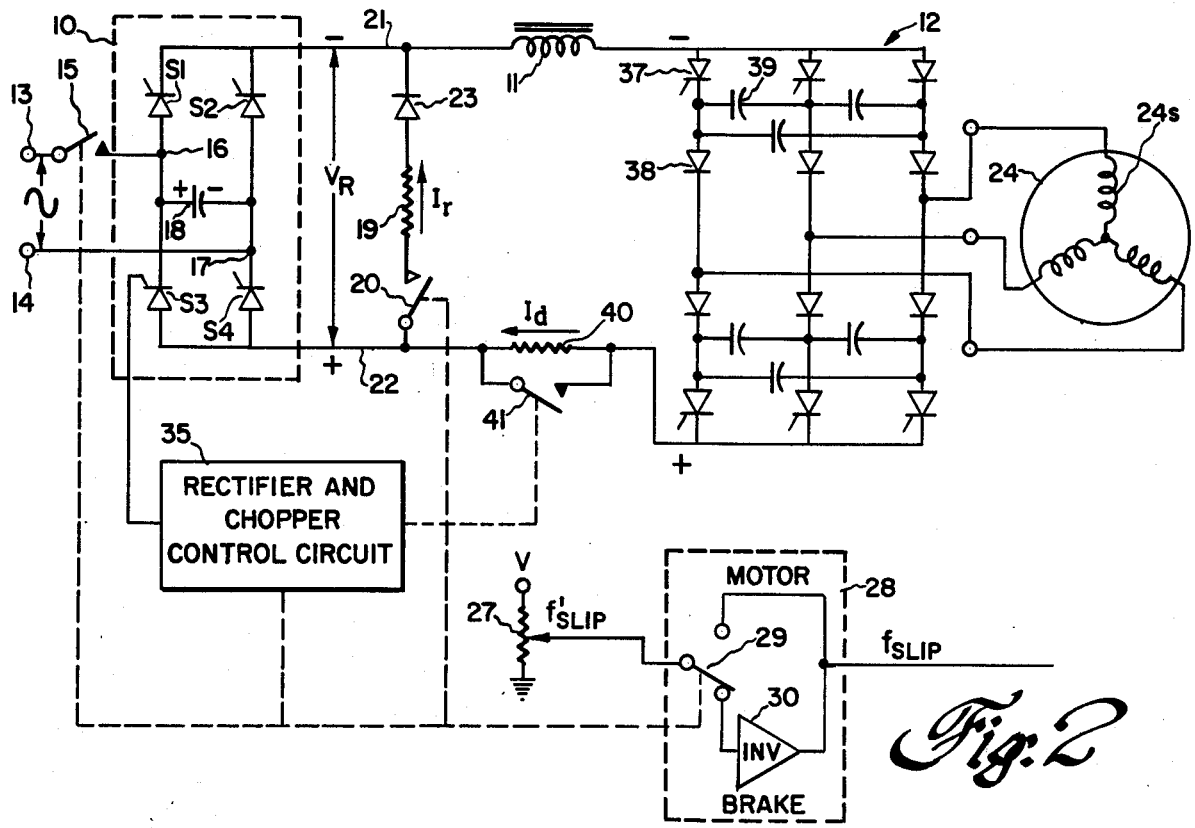
FIG. 2 is a detailed circuit diagram of the current source power converter of FIG. 1 and selected portions of the control circuit.

Three phase current-fed inverter 12 is typically the six thyristor, auto-sequential commutated inverter shown in FIG. 2, although other types of current-fed inverters are also suitable. In each of the six inverter legs is a thyristor 37 and a series connected blocking diode 38, with three delta-connected commutating capacitors 39 provided between the intersections of each thyristor and diode in the upper inverter section for producing positive polarity rectangular wave output currents. Similarly, a second bank of commutating capacitors is provided between the intersections of each thyristor and diode in the lower inverter section for producing negative polarity rectangular wave output currents. As is known in the art, the conducting thyristor is turned off upon supplying a gating pulse to the next thyristor in sequence by means of the parallel capacitor commutation mechanism. The blocking diodes in series with the thyristors serve to isolate the commutating capacitors from the load. The output current in each phase ideally has a rectangular waveshape with a 120° duration in each half cycle, neglecting commutation. Since the per phase rectangular wave output currents are 120° displaced from one another, at any moment two stator windings 24s are conducting while the remaining phase is open-circuited. The current source power converter has the capability for power flow in both directions, to transfer power from the ac input to the motor in the motoring mode, and to return power to the supply in the generating mode of the motor. During reverse power flow, the polarity of the current through dc smoothing reactor 11 and inverter 12 is the same as during forward power flow, however under reverse power flow conditions the polarity of the inverter input voltage is negative and the dc output voltage $V_R$ of controlled rectifier 10 is also negative as is shown by the polarity signs. Accordingly, assuming that dynamic braking switch 20 is open, this motor drive system is capable of regenerative braking mode operation in which the controlled bridge rectifier is operated as a line commutated inverter to return power to the ac supply. However, regenerative braking is not always desirable or possible, such as in large traction drives and other applications where the motor drive system is vehicle-mounted and the connecting ac line will not accept the returned power. Provision for controlled dynamic braking as herein explained is therefore essential or highly desirable for these types of applications.

As has been mentioned, under dynamic braking mode conditions, ac line switch 15 is opened and dynamic braking switch 20 is closed, and combined controlled rectifier and chopper 10 is operated as a chopper circuit to control the average dc voltage between rectifier output terminals 21 and 22 and thus the voltage across braking resistor 19. The opening and closing of switches 15 and 20 can be coordinated with the movement of switch 29 in motor-brake control 28 from the motor position to the brake position. This switching action normally occurs in response to movement of the operator controls by the operator when he wishes to brake to a stop. The opening of ac line switch 15 is desirably at or near the current zero of the ac supply in order to provide easy duty on the ac breaker. In the absence of interruption at the current zero, by properly controlling the rectifier as is known in the art, the line current can be reduced to a low value approximately equal to the ac current in commutating capacitor 18. Once ac line switch 15 is open, the rectifier and chopper control circuit 35 is switched to operate combined controlled rectifier and chopper 10 as a chopper circuit. FIG. 2 shows a modification in which a second braking resistor 40 is included in the dc link between combined controlled rectifier and chopper 10 and controlled current inverter 12, with a second normally closed braking switch 41 connected across it to provide additional braking resistance when commanded by rectifier and chopper control circuit 35. Opening switch 41 increases the average dc link voltage but does not change the chopper circuit operation and thus for the moment is assumed to be closed. While contactor type switches are shown in series and parallel with the braking resistors, thyristor type switches can serve the same purpose.

To operate the controlled bridge rectifier with added commutating capacitor 18 as a chopper, either thyristor pair S1 and S3 or thyristor pair S2 and S4 is rendered conductive for a predetermined interval thereby bypassing the dc link current $I_d$ through the controlled rectifier so that the voltage between rectifier output terminals 21 and 22 is nearly zero. In the alternating intervals the current path is through braking resistor 19 thereby dissipating energy and establishing a voltage drop between the rectifier output terminals equal to approximately the product of $I_d$ and the resistance value of resistor 19. The resulting quasi-square wave or quasi-rectangular wave current $I_r$ through braking resistor 19 is shown in FIG. 3f, and the dc link voltage or the voltage between the rectifier output terminals is proportional. Since the chopping rate of the controlled bridge rectifier functioning as a chopper can be controlled, variable width voltage pulses are generated between the rectifier output terminals during dynamic braking to thereby control the magnitude of the dc current fed to the controlled current inverter during braking. The chopper operation is similar to that of a pulse width modulated regulator.

To further explain the control of combined controlled rectifier and chopper 10 to function as a chopper, reference is also made to the capacitor voltage and several current waveforms shown in FIGS. 3a–3f. Assume that the path of dc link current is initially through thyristors S1 and S3 and that commutating capacitor 18 is negatively charged with the lefthand plate positive. Thyristor S4 is fired to turn off S3 by the parallel capacitor commutation mechanism. The charge on commutating capacitor 18 oscillates and capacitor 18 charges positively sufficient to reverse bias and turn off S1 and S4 as the capacitor current goes to zero. It is noted in FIGS. 3d and 3e that S4 and S1 continue to conduct during the turn-off time $t_q$ of thyristor S3, and then begin to turn off. The dc link current $I_d$ through the controlled rectifier switches, resulting in zero voltage between the rectifier output terminals, is now diverted to the path through braking resistor 19, resulting in a maximum value of voltage between the rectifier output terminals. To rotate the switching duty, thyristors S2 and S4 are now fired to bypass the current around the braking resistor. Commutation of thyristor S4 is then accomplished by firing thyristor S3. By controlling the chopping rate, the duration of the alternating intervals of conduction of current through the braking resistor and through the controlled rectifier can be varied, thereby varying the average dc link voltage. With proper control of the bridge rectifier, enough capacitor energy to commutate the dc link current is assured. Diode 23 in series with braking resistor 19 is used to reduce the size of commutating capacitor 18 by preventing capacitor current into the braking resistor during turn-off of S3 or S4. If S3 and S4 are fast turn-off devices, the size of the commutating capacitor is reduced further. While S3 and S4 are shown as the commuating thyristors, the duty may alternately be shared by S1 and S2 to distribute evenly the power dissipation of the four rectifier thyristors. An advantage of this form of combined controlled rectifier and chopper is that the circuit requires no additional power thyristors (silicon controlled rectifiers) over those needed for motoring or regeneration.

Three-phase combined controlled rectifier and chopper 10' shown in FIG. 4 is similar to the single phase version in FIG. 2 and can be operated as a chopper in the same or analogous manner. The three-phase controlled bridge rectifier as is conventional employs six thyristors or other controlled switch devices S1–S6, with an added bank of delta-connected commutating capacitors 18' connected directly between the rectifier input terminals. A three-phase ac line switch 15', of course, is also used in this modification. For chopper circuit operation, it is evident that only four thyristors, such as S1–S4, and only one commutating capacitor 18' need be used, although a control scheme is possible in which the duty is shared or rotated among six thyristors and three commutating capacitors. By opening the switch 41 in FIG. 2 and placing the additional braking resistor 40 in the circuit, it is evident that the minimum dc link voltage obtained with current through the controlled rectifier is given by the product of $I_d$ and the resistance value of resistor 40. The maximum dc link voltage with current through both braking resistors 40 and 19 is correspondingly higher. As before, however, the average dc link voltage is varied by controlling the voltage between rectifier output terminals 21 and 22 and thus the voltage across braking resistor 19. During dynamic braking mode operation, the average dc link voltage and thus the magnitude of current fed to controlled inverter 12 can be varied linearly or in any desired manner. Constant torque operation during dynamic braking is desirable to assure controlled and stable motor deceleration.

In another embodiment of the invention illustrated in FIG. 5, combined controlled rectifier and chopper 10" further includes an auxiliary gate controlled thyristor 42 connected between rectifier output terminals 21 and 22 with a polarity to selectively shunt the braking resistor during braking. In this embodiment the controlled bridge rectifier with added commutating capacitor 18 is used as a commutating circuit for auxiliary thyristor 42. Referring also to the voltage and current waveforms in FIGS. 6a-6c, commutating capacitor 18 is assumed to be negatively charged (left-hand plate positive) and auxiliary thyristor 42 conducting. Thyristors S1 and S4 are fired thereby commutating off auxiliary thyristor 42 and forcing the capacitor voltage to change linearly. By making the auxiliary thyristor a high speed device, the size of commutating capacitor 18 can be reduced. When the voltage across auxiliary thyristor 42 becomes positive, diode 23 conducts diverting current from S1 and S4 to braking resistor 19. On the next half cycle, thyristors S2 and S3 are fired. The variable width voltage pulses generated between rectifier output terminals 21 and 22 are then proportional to the resulting quasi-square wave braking resistor current $I_r$. As is shown in dashed lines in FIG. 4, three-phase combined controlled rectifier and chopper 10' can be modified to include the auxiliary thyristor 42 and can be operated in similar fashion to function as a commutating circuit for the auxiliary thyristor. As was previously explained, four thyristors and a single commutating capacitor can be operated in the same manner as the single phase version, or all six thyristors and three commutating capacitors can be used if it is desired to rotate the duty among all the controlled bridge thyristors. While not illustrated here, a suitable rectifier and chopper control circuit similar to control circuit 35 in FIG. 2 is provided, and for further information reference is made to *The SCR Manual* (5th Edition), copyright 1972, published by the General Electric Company and available from the Semiconductor Products Department, Syracuse, New York.

FIG. 7 shows a further modification in which diode 23 and switch 20 are replaced by a thyristor 43 to facilitate alternating regenerative and dynamic braking. Assuming that ac line switch 15 is closed while thyristor 43 remains turned off, the controlled rectifier is operated as an inverter to feed power back to the ac line. When during each half cycle it has been determined that the ac line will not accept the power, thyristor 43 is fired to provide a path for current through braking resistor 19. Thyristor 43 is commutated off each time the dc link voltage transiently goes positive during inverter operation of the rectifier. Thus, a combination of regenerative and dynamic braking is possible.

In summary, improved controlled current induction and synchronous motor drive systems with provision for controlled dynamic braking or constant torque control during braking have been described, particularly for large traction drives such as electrified locomotives and similar applications including those where regenerative braking is not possible. The power dissipated by the braking resistance is controlled in a satisfactory and economical manner with a minimum of required added power circuit components as compared to those required for normal motoring mode operation.

While the invention has been particularly shown and described with reference to several embodiments thereof, it will be understood by those skilled in the art that the foregoing and other changes in form and details may be made therein without departing from the spirit and scope of the invention.

The invention claimed is:

1. A motor control circuit for a controlled current motor drive system comprising
    a current source power converter comprising combined full wave contolled rectifier and chopper means and also controlled current inverter means coupled in cascade with a direct-current reactor therebetween,
    said combined controlled rectifier and chopper means having a pair of rectifier output terminals directly between which is connected in series a braking resistor and dynamic braking switch, and
    control means for operating said current source power converter to produce variable amplitude and frequency rectangular wave output current to be supplied to a motor winding,
    said control means under dynamic braking mode conditions further being operative to close said braking switch and operate said combined controlled rectifier and chopper means as a chopper circuit to generate variable width voltage pulses between said rectifier output terminals and across said braking resistor and thus control the direct current magnitude fed to said controlled current inverter means during dynamic braking.

2. A motor control circuit according to claim 1 wherein said combined controlled rectifier and chopper means has a plurality of rectifier input terminals and includes a plurality of pairs of controlled switch devices each connected in series between said rectifier output terminals with the junction of each pair of controlled switch devices connected to a different one of said rectifier input terminals, a commutating capacitor being connected directly between each different pair of said rectifier input terminals, and
    a line switch coupling said rectifier input terminals to a plurality of circuit input terminals, said control means under braking conditions further operating to open said line switch.

3. A motor control circuit according to claim 2 wherein said combined controlled rectifier and chopper means further includes a gate controlled thyristor connected directly between said rectifier output terminals with a polarity to shunt said braking resistor during braking.

4. A motor control circuit according to claim 1 wherein said dynamic braking switch in series with said braking resistor is a thyristor to facilitate alternate regenerative and dynamic braking operation.

5. A motor control circuit for a controlled current motor drive system comprising
    a current source power converter comprising combined full wave controlled rectifier and chopper means and also controlled current inverter means coupled in cascade with a direct-current reactor therebetween for producing variable amplitude and frequency rectangular wave output current to be supplied to a motor winding, said combined controlled rectifier and chopper means having a pair of output terminals directly between which is connected in series a braking resistor and dynamic braking switch, and further having a plurality of input terminals connected through a line switch to a plurality of circuit input terminals, and control means for operating said combined controlled rectifier and chopper means as a phase controlled rectifier to vary the unidirectional output voltage thereof and thus the magnitude of the direct current fed to said controlled current inverter means under motoring mode conditions, said control means also determining the operating frequency of said controlled current inverter means, said control means under dynamic braking mode conditions further being operative to close said braking switch and open said line switch and to operate said combined controlled rectifier and chopper means as a chopper circuit to generate variable width voltage pulses between said rectifier output terminals, and thereby control the direct current magnitude fed to said controlled current inverter means during dynamic braking.

6. A motor control circuit according to claim 5 wherein said combined controlled rectifier and chopper means includes a plurality of pairs of thyristors each connected in series between said rectifier output terminals with the junction of each thyristor pair connected to one of said rectifier input terminals, and a commutating capacitor connected directly between each different pair of said rectifier input terminals.

7. A motor control circuit according to claim 6 wherein said combined controlled rectifier and chopper means further includes an auxiliary thyristor connected between said rectifier output terminals with a polarity to selectively shunt said braking resistor during dynamic braking.

8. A motor control circuit according to claim 6 further including a second braking resistor coupled between said combined controlled rectifier and chopper means and said controlled current inverter means, and a second normally closed braking switch connected across said second braking resistor and arranged to be opened selectively by said control means when additional braking resistance is required.

9. A motor control circuit according to claim 7 wherein said dynamic braking switch in series with said braking resistor is a thyristor to facilitate alternate regenerative and dynamic braking operation.

* * * * *